(12) United States Patent
Hao

(10) Patent No.: US 11,191,111 B2
(45) Date of Patent: Nov. 30, 2021

(54) BLUETOOTH CONNECTION ESTABLISHMENT METHOD, DEVICE AND SYSTEM

(71) Applicant: BOE TECHNOLOGY GROUP CO., LTD., Beijing (CN)

(72) Inventor: Zhenxing Hao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/834,635

(22) Filed: Mar. 30, 2020

(65) Prior Publication Data

US 2021/0144780 A1 May 13, 2021

(30) Foreign Application Priority Data

Nov. 8, 2019 (CN) .......................... 201911088880.1

(51) Int. Cl.
*H04W 76/10* (2018.01)
*H04W 4/80* (2018.01)

(52) U.S. Cl.
CPC ............. *H04W 76/10* (2018.02); *H04W 4/80* (2018.02)

(58) Field of Classification Search
CPC ................................. H04W 76/10; H04W 4/80
See application file for complete search history.

(56) References Cited

U.S. PATENT DOCUMENTS

| | | | |
|---|---|---|---|
| 2015/0032641 A1 | 1/2015 | Ding et al. | |
| 2016/0098689 A1* | 4/2016 | Bowles | G07F 7/06 705/23 |

(Continued)

FOREIGN PATENT DOCUMENTS

| | | |
|---|---|---|
| CN | 102694706 A | 9/2012 |
| CN | 103473576 A | 12/2013 |

(Continued)

OTHER PUBLICATIONS

Office Action of CN Application No. 201911088880.1 and English translation, dated Mar. 29, 2021, 15 pages.

(Continued)

*Primary Examiner* — Tuan H Nguyen

(74) *Attorney, Agent, or Firm* — Muncy, Geissler, Olds & Lowe, P.C.

(57) ABSTRACT

The present disclosure provides a Bluetooth connection establishment method, a Bluetooth connection establishment device and a Bluetooth connection establishment system. The method includes: scanning a quick response (QR) code corresponding to a controlled terminal device, and identifying the QR code through a preset algorithm to obtain device information corresponding to the controlled terminal device; transmitting the device information to a cloud server, thereby enabling the cloud server to extract the device unique identifier and the device model identifier from the device information, and to find functional characteristics corresponding to the controlled terminal device according to the device model identifier; receiving the device unique identifier and the functional characteristics transmitted by the cloud server; and establishing a Bluetooth connection with the controlled terminal device according to the device unique identifier, and outputting and displaying a function page corresponding to the controlled terminal device according to the functional characteristics.

18 Claims, 3 Drawing Sheets

(56) References Cited

U.S. PATENT DOCUMENTS

| | | |
|---|---|---|
| 2016/0128124 A1 | 5/2016 | Liu et al. |
| 2017/0031640 A1 | 2/2017 | Fu et al. |
| 2017/0086233 A1 | 3/2017 | Lin |
| 2017/0323279 A1* | 11/2017 | Dion ............... G06Q 30/0279 |
| 2018/0139319 A1 | 5/2018 | Jiang |

FOREIGN PATENT DOCUMENTS

| | | |
|---|---|---|
| CN | 103810832 A | 5/2014 |
| CN | 104144470 A | 11/2014 |
| CN | 104820643 A | 8/2015 |
| CN | 105139877 A | 12/2015 |
| CN | j-105159523 A | 12/2015 |
| CN | 105223826 A | 1/2016 |
| CN | 106131971 A | 11/2016 |
| CN | 106453540 A | 2/2017 |
| CN | 106547563 A | 3/2017 |

OTHER PUBLICATIONS

Office Action dated Oct. 19, 2021 in CN Application No. 201911088880. 1, 13 pages, w/English Translation.

* cited by examiner

BLUETOOTH CONNECTION ESTABLISHMENT METHOD, DEVICE AND SYSTEM

CROSS-REFERENCE TO RELATED APPLICATION

This application claims the benefit and priority of Chinese Application No. 201911088880.1, filed on Nov. 8, 2019, the disclosures of which are incorporated in their entirety by reference herein.

TECHNICAL FIELD

The present disclosure relates to the field of Bluetooth technologies, and in particular to a Bluetooth connection establishment method, a Bluetooth connection establishment device and a Bluetooth connection establishment system.

BACKGROUND

With continuous development of science and technology, Bluetooth technology has developed rapidly, and more and more terminal devices have Bluetooth capabilities. In daily life, users often establish a Bluetooth connection between two terminal devices through the Bluetooth function. Based on the Bluetooth connection between the two terminal devices, communication between the two terminal devices can be performed, thereby using one terminal device (which is referred as a controlling terminal device) to control another terminal device (which is referred as a controlled terminal device) to perform corresponding operations.

Currently, when two terminal devices establish a Bluetooth connection, they usually use their respective Bluetooth addresses (Media Access Control, MAC) as unique identification identifiers. However, a device model of one terminal device cannot be identified based on a Bluetooth address of the one terminal device. Thus, after the controlling terminal device establishes a Bluetooth connection with the controlled terminal device, the controlling terminal device cannot obtain a device model of the controlled terminal device, and then the controlling terminal device cannot inform users of functions of the controlled terminal device. As a result, the users cannot accurately control the controlled terminal device to perform corresponding operations through the controlling terminal device.

SUMMARY

One embodiment of the present disclosure provides a Bluetooth connection establishment method, applied to a controlling terminal device, including: scanning a quick response (QR) code corresponding to a controlled terminal device, and identifying the QR code through a preset algorithm to obtain device information corresponding to the controlled terminal device; wherein the device information includes device unique identifier and device model identifier corresponding to the controlled terminal device; transmitting the device information to a cloud server, thereby enabling the cloud server to extract the device unique identifier and the device model identifier from the device information, and to find functional characteristics corresponding to the controlled terminal device according to the device model identifier; receiving the device unique identifier and the functional characteristics transmitted by the cloud server; and establishing a Bluetooth connection with the controlled terminal device according to the device unique identifier, and outputting and displaying a function page corresponding to the controlled terminal device according to the functional characteristics.

In one embodiment, the establishing a Bluetooth connection with the controlled terminal device according to the device unique identifier, includes: performing splicing processing on the device unique identifier according to a preset rule, thereby generating a Bluetooth matching name corresponding to the controlled terminal device; searching for the controlled terminal device based on the Bluetooth matching name, thereby obtaining a Bluetooth address corresponding to the controlled terminal device; establishing the Bluetooth connection with the controlled terminal device based on the Bluetooth address.

In one embodiment, the QR code further records a product line identifier corresponding to the controlled terminal device; the identifying the QR code through a preset algorithm to obtain device information corresponding to the controlled terminal device, includes: identifying the QR code through the preset algorithm to obtain the device information and product line identifier corresponding to the controlled terminal device; the performing splicing processing on the device unique identifier according to a preset rule, thereby generating a Bluetooth matching name corresponding to the controlled terminal device, includes: searching for a company identifier corresponding to the controlled terminal device according to the product line identifier; splicing the company identifier and the device unique identifier according to the preset rule, thereby generating the Bluetooth matching name.

In one embodiment, he establishing a Bluetooth connection with the controlled terminal device based on the Bluetooth address, includes: judging whether cache configuration information corresponding to the controlled terminal device is stored in a local storage space according to the Bluetooth address; when the cache configuration information corresponding to the controlled terminal device is stored in the local storage space, using the cache configuration information to configure a Bluetooth adapter, thereby establishing the Bluetooth connection with the controlled terminal device; when the cache configuration information corresponding to the controlled terminal device is not stored in the local storage space, obtaining configuration information corresponding to the controlled terminal device according to the Bluetooth address, and using the obtained configuration information to configure the Bluetooth adapter, thereby establishing the Bluetooth connection with the controlled terminal device.

In one embodiment, after obtaining the configuration information corresponding to the controlled terminal device according to the Bluetooth address, the method further includes: storing the obtained configuration information in the local storage space.

In one embodiment, the method further includes: when establishing a Bluetooth connection with the controlled terminal device fails, re-establishing a Bluetooth connection with the controlled terminal device according to the device unique identifier; when a Bluetooth connection with the controlled terminal device fails to be established for multiple times, outputting a first preset prompt reminder to notify that Bluetooth connection is abnormal.

In one embodiment, after the establishing a Bluetooth connection with the controlled terminal device according to the device unique identifier, the method further includes: transmitting a preset check code to the controlled terminal device, thereby enabling the controlled terminal device to perform identity verification for the controlling terminal device, to determine whether to maintain the Bluetooth connection with the controlling terminal device.

In one embodiment, the outputting and displaying a function page corresponding to the controlled terminal device according to the functional characteristics, includes: selecting function pages corresponding to the controlled terminal device from multiple preset function pages according to the functional characteristics; outputting and displaying the function page corresponding to the controlled terminal device through a screen.

In one embodiment, after the outputting and displaying a function page corresponding to the controlled terminal device according to the functional characteristics, the method further includes: receiving an operation instruction on the function page; transmitting the operation instruction to the controlled terminal device through the Bluetooth connection with the controlled terminal device, thereby enabling the controlled terminal device to perform operation corresponding to the operation instruction.

In one embodiment, the method further includes: when receiving an error message transmitted by the cloud server, outputting a second preset prompt reminder to notify that the QR code has been scanned incorrectly.

One embodiment of the present disclosure provides a controlling terminal device including: a scanner configured to scan a quick response (QR) code corresponding to a controlled terminal device; a recognizer configured to identify the QR code through a preset algorithm to obtain device information corresponding to the controlled terminal device; wherein the device information includes device unique identifier and device model identifier corresponding to the controlled terminal device; a first transmitter configured to transmit the device information to a cloud server, thereby enabling the cloud server to extract the device unique identifier and the device model identifier from the device information, and to find functional characteristics corresponding to the controlled terminal device according to the device model identifier; a first receiver configured to receive the device unique identifier and the functional characteristics transmitted by the cloud server; a first establishment circuit configured to establish a Bluetooth connection with the controlled terminal device according to the device unique identifier; a first outputter configured to output and display a function page corresponding to the controlled terminal device according to the functional characteristics.

In one embodiment, the first establishment circuit includes: a splicing circuit configured to perform splicing processing on the device unique identifier according to a preset rule, thereby generating a Bluetooth matching name corresponding to the controlled terminal device; a searching circuit configured to search for the controlled terminal device based on the Bluetooth matching name, thereby obtaining a Bluetooth address corresponding to the controlled terminal device; an establishment circuit configured to establish a Bluetooth connection with the controlled terminal device based on the Bluetooth address.

In one embodiment, the QR code further records a product line identifier corresponding to the controlled terminal device; the recognizer is configured to identify the QR code through the preset algorithm to obtain device information and product line identifier corresponding to the controlled terminal device. The splicing circuit includes: a searching sub-circuit configured to search for a company identifier corresponding to the controlled terminal device according to the product line identifier; a splicing sub-circuit configured to splice the company identifier and the device unique identifier according to the preset rule, thereby generating the Bluetooth matching name.

In one embodiment, the establishment circuit includes: a judgement sub-circuit configured to judge whether cache configuration information corresponding to the controlled terminal device is stored in a local storage space according to the Bluetooth address; a first configuration sub-circuit configured to, when the judgement sub-circuit judges that the cache configuration information corresponding to the controlled terminal device is stored in the local storage space, use the cache configuration information to configure a Bluetooth adapter, thereby establishing the Bluetooth connection with the controlled terminal device; an obtaining sub-circuit configured to, when the judgement sub-circuit judges that the cache configuration information corresponding to the controlled terminal device is not stored in the local storage space, obtain configuration information corresponding to the controlled terminal device according to the Bluetooth address; a second configuration sub-circuit configured to, use the obtained configuration information to configure the Bluetooth adapter, thereby establishing the Bluetooth connection with the controlled terminal device.

In one embodiment, the establishment circuit further includes: a storage sub-circuit configured to, after the obtaining sub-circuit obtains the configuration information corresponding to the controlled terminal device according to the Bluetooth address, store the obtained configuration information in the local storage space.

In one embodiment, the controlling terminal device further includes: a second establishment circuit configured to, when establishing a Bluetooth connection with the controlled terminal device fails, re-establish a Bluetooth connection with the controlled terminal device according to the device unique identifier; a second outputter configured to, when a Bluetooth connection with the controlled terminal device fails to be established for multiple times, output a first preset prompt reminder to notify that the Bluetooth connection is abnormal; a third outputter configured to, when receiving an error message transmitted by the cloud server, output a second preset prompt reminder to notify that the QR code has been scanned incorrectly.

In one embodiment, the controlling terminal device further includes: a second transmitter configured to, after the first establishment circuit establishes the Bluetooth connection with the controlled terminal device according to the device unique identifier, transmit a preset check code to the controlled terminal device, thereby enabling the controlled terminal device to perform identity verification for the controlling terminal device, to determine whether to maintain the Bluetooth connection with the controlling terminal device.

In one embodiment, the first outputter includes: a selection circuit configured to select function pages corresponding to the controlled terminal device from multiple preset function pages according to the functional characteristics; an outputting circuit configured to output and display the function page corresponding to the controlled terminal device through a screen.

In one embodiment, the controlling terminal device further includes: a second receiver configured to, after the first outputter outputs and displays the function page corresponding to the controlled terminal device according to the functional characteristics, receive an operation instruction on the function page; a third transmitter configured to transmit the operation instruction to the controlled terminal device through the Bluetooth connection with the controlled terminal device, thereby enabling the controlled terminal device to perform operation corresponding to the operation instruction.

One embodiment of the present disclosure provides an electronic device including: a memory; a processor; and a program stored on the memory and executable on the processor. The processor executes the program to implement a Bluetooth connection establishment method which includes: scanning a quick response (QR) code corresponding to a controlled terminal device, and identifying the QR code through a preset algorithm to obtain device information corresponding to the controlled terminal device; wherein the device information includes device unique identifier and device model identifier corresponding to the controlled terminal device; transmitting the device information to a cloud server, thereby enabling the cloud server to extract the device unique identifier and the device model identifier from the device information, and to find functional characteristics corresponding to the controlled terminal device according to the device model identifier; receiving the device unique identifier and the functional characteristics transmitted by the cloud server; and establishing a Bluetooth connection with the controlled terminal device according to the device unique identifier, and outputting and displaying a function page corresponding to the controlled terminal device according to the functional characteristics.

The above description is only an overview of the technical solution of the present disclosure. In order to understand the technical solution of the present disclosure more clearly, it can be implemented in accordance with the content of the description. In order to make the above and other objects, features and advantages of the present disclosure more comprehensible, specific embodiments of the present disclosure are given below.

BRIEF DESCRIPTION OF THE DRAWINGS

In order to illustrate technical solutions according to embodiments of the present disclosure or in the related art more clearly, drawings to be used in the description of the embodiments or in the related art will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solution of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Figure 1:
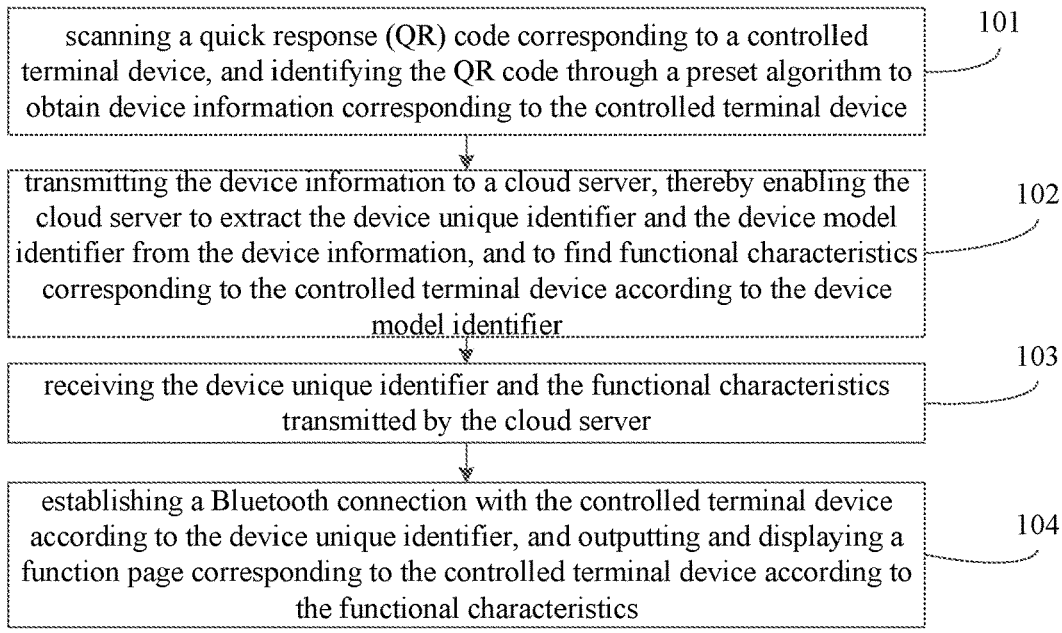
FIG. 1 is a flowchart of a Bluetooth connection establishment method according to an embodiment of the present disclosure.

One embodiment of the present disclosure provides a Bluetooth connection establishment method. As shown in FIG. 1, the method includes the following steps.

Step 101: scanning a quick response (QR) code corresponding to a controlled terminal device, and identifying the QR code through a preset algorithm to obtain device information corresponding to the controlled terminal device.

It should be noted that, in embodiments of the present disclosure, an execution entity in each step is a client application program running in a controlling terminal device. The controlling terminal device may be, but is not limited to, a smart phone, a tablet computer, and a notebook computer and the like.

In one embodiment of the present disclosure, the controlled terminal device generates in advance the QR code according to device information (i.e., device unique identifier and device model identifier corresponding to the controlled terminal device) and product line identifier corresponding to the controlled terminal device. The controlled terminal device outputs and displays the generated QR code through a screen of the controlled terminal device. The device information corresponding to the controlled terminal device may be a string composed of "device unique identifier corresponding to the controlled terminal device+preset special character+device model identifier corresponding to the controlled terminal device". The device unique identifier corresponding to the controlled terminal device is an identification code, which is generated by a production line for uniquely identifying the controlled terminal device when producing the controlled terminal device. The product line identifier corresponding to the controlled terminal device is used to identify the product line for the controlled terminal device. The controlled terminal device may be, but is not limited to, a picture screen terminal device, a smart speaker, etc.

When a user needs to establish a Bluetooth connection between the controlling terminal device and the controlled terminal device, the user first needs to call a preset camera through the client application program in the controlling terminal device and then scan the QR code corresponding to the controlled terminal device through the called preset camera. After the client application program obtains the QR code corresponding to the controlled terminal device by scanning the QR code corresponding to the controlled terminal device, the client application program can identify the scanned QR code through the preset algorithm, thereby obtaining the device information corresponding to the controlled terminal device, which is recorded in the QR code.

Step 102: transmitting the device information to a cloud server, thereby enabling the cloud server to extract the device unique identifier and the device model identifier from the device information, and to find functional characteristics corresponding to the controlled terminal device according to the device model identifier.

The cloud server stores a mapping relationship between functional characteristics and a device model identifier corresponding to each model of terminal device. The functional characteristics corresponding to the terminal device are used to indicate what functions the terminal device has.

In one embodiment of the present disclosure, after the client application program obtains the device information corresponding to the controlled terminal device, the client application program transmits the obtained device information to the cloud server. After receiving the device information corresponding to the controlled terminal device, the cloud server can extract the device unique identifier and the device model identifier corresponding to the controlled terminal device from the device information corresponding to the controlled terminal device. Since the cloud server stores the mapping relationship between functional characteristics and the device model identifier corresponding to each model of terminal device, the cloud server can find functional characteristics corresponding to the controlled terminal device according to the device model identifier corresponding to the controlled terminal device.

Specifically, in this step, when the device information corresponding to the controlled terminal device is a string composed of "device unique identifier corresponding to the controlled terminal device+preset special character+device model identifier corresponding to the controlled terminal device", the cloud server can extract the device unique identifier and device model identifier corresponding to the controlled terminal device from the device information by intercepting the "preset special character" in the device information, which is not limited thereto.

It should be noted that, in actual application process, the staff at the cloud server side can modify or delete the mapping relationship between functional characteristics and the device model identifier corresponding to each model of terminal device stored in the cloud server through a middle-stage management device, and may also store a mapping relationship between functional characteristics and a device model identifier corresponding to a new model of terminal device, which are not specifically limited in this embodiment of the present disclosure.

Step 103: receiving the device unique identifier and the functional characteristics transmitted by the cloud server.

In one embodiment of the present disclosure, after the cloud server extracts the device unique identifier and the device model identifier corresponding to the controlled terminal device from the device information corresponding to the controlled terminal device as well as finds the functional characteristics corresponding to the controlled terminal device according to the device model identifier corresponding to the controlled terminal device, the cloud server transmits the device unique identifier and the functional characteristics corresponding to the controlled terminal device to the client application program. At this point, the client application program can receive the device unique identifier and the functional characteristics corresponding to the controlled terminal device.

Specifically, in this step, the cloud server may serialize the device unique identifier and functional characteristics corresponding to the controlled terminal device, encapsulate the device unique identifier and functional characteristics corresponding to the controlled terminal device into JSON-formatted data, and transmit the JSON-formatted data to the client application program. After the client application program deserializes the JSON-formatted data, the client application program can obtain the device unique identifier and functional characteristics corresponding to the controlled terminal device, which is not limited thereto.

Step 104: establishing a Bluetooth connection with the controlled terminal device according to the device unique identifier, and outputting and displaying a function page corresponding to the controlled terminal device according to the functional characteristics.

In one embodiment of the present disclosure, since a Bluetooth device name corresponding to the controlled terminal device is generated based on the device unique identifier corresponding to the controlled terminal device, after the client application program receives the device unique identifier and functional characteristics corresponding to the controlled terminal device transmitted by the cloud server, the client application program can search for the controlled terminal device according to the device unique identifier corresponding to the controlled terminal device, thereby obtaining the Bluetooth address corresponding to the controlled terminal device and then establishing a Bluetooth connection with the controlled terminal device based on the Bluetooth address corresponding to the controlled terminal device. After establishing the Bluetooth connection with the controlled terminal device, the client application program can output and display the function page corresponding to the controlled terminal device according to the functional characteristics corresponding to the controlled terminal device. Functions indicated in each function page displayed and outputted by the client application program are multiple functions possessed by the controlled terminal device. Through the function page displayed and outputted by the client application program, the user can know what functions the controlled terminal device has, and then the user can accurately control the controlled terminal device to perform corresponding operations through the client application program (i.e., controlling terminal device).

Compared with the related art in which a controlling terminal device and a controlled terminal device use their respective Bluetooth addresses as unique identification identifiers when they establish a Bluetooth connection, in the Bluetooth connection establishment method of one embodiment of the present disclosure, the controlled terminal device generates in advance the QR code according to the device information (i.e., device unique identifier and device model identifier corresponding to the controlled terminal device) corresponding to the controlled terminal device, outputs and displays the generated QR code through a screen of the controlled terminal device; when the user needs to establish a Bluetooth connection between the controlling terminal device and the controlled terminal device, the user first needs to call a preset camera through the client application program in the controlling terminal device and then scan the QR code corresponding to the controlled terminal device through the called preset camera; after obtaining the scanned QR code corresponding to the controlled terminal device, the client application program can identify the scanned QR code through the preset algorithm, thereby obtaining the device information corresponding to the controlled terminal device and transmitting the obtained device information to the cloud server. Then, the cloud server extracts the device unique identifier and device model identifier corresponding to the controlled terminal device from the device information corresponding to the controlled terminal device, finds functional characteristics corresponding to the controlled terminal device according to the device model identifier corresponding to the controlled terminal device, and then transmits the device model identifier and functional characteristics corresponding to the controlled terminal device to the client application program. Since a Bluetooth device name corresponding to the controlled terminal device is generated based on the device unique identifier corresponding to the controlled terminal device, the client application program can search for the controlled terminal device according to the device unique identifier corresponding to the controlled terminal device, and then establish a Bluetooth connection with the controlled terminal device. After establishing the Bluetooth connection with the controlled terminal device, the client application program can output and display the function page corresponding to the controlled terminal device according to the functional characteristics corresponding to the controlled terminal device. Since functions indicated in each function page displayed and outputted by the client application program are multiple functions possessed by the controlled terminal device, the user can know what functions the controlled terminal device has through the function page displayed and outputted by the client application program. Then, the user can accurately control the controlled terminal device to perform corresponding operations through the client application program (i.e., controlling terminal device).

Figure 2:
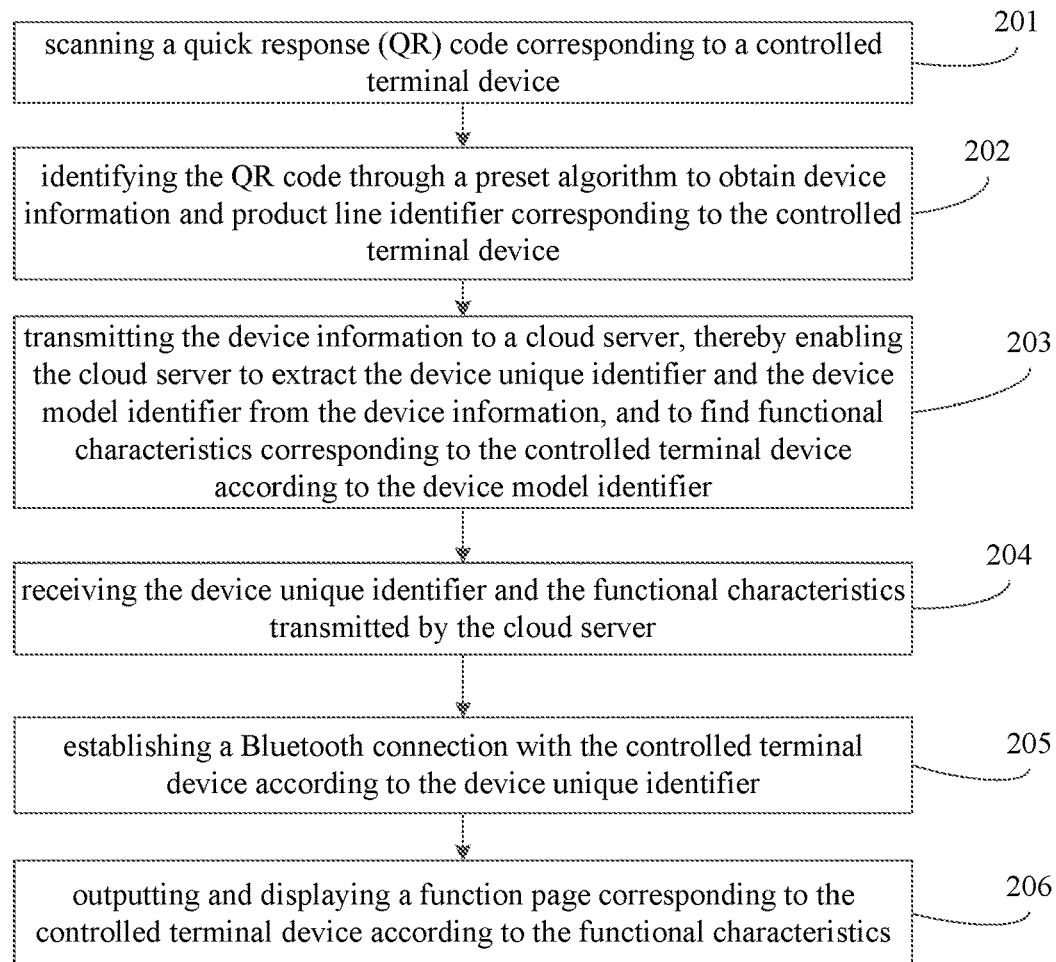
FIG. 2 is another flowchart of a Bluetooth connection establishment method according to an embodiment of the present disclosure.

In order to describe in details hereinafter, one embodiment of the present disclosure provides a Bluetooth connection establishment method. As shown in FIG. 2, the method includes the following steps.

Step 201: scanning a quick response (QR) code corresponding to a controlled terminal device.

The step 201 of scanning the QR code corresponding to the controlled terminal device may refer to description of the corresponding part in FIG. 1, which will not be repeated herein.

Step 202: identifying the QR code through a preset algorithm to obtain device information and product line identifier corresponding to the controlled terminal device.

In one embodiment of the present disclosure, since the QR code corresponding to the controlled terminal device is generated by the controlled terminal device according to the device information (i.e., device unique identifier and device model identifier corresponding to the controlled terminal device) and product line identifier corresponding to the controlled terminal device, a client application program identifies the scanned QR code through a preset algorithm to obtain the device information and product line identifier corresponding to the controlled terminal device.

Step 203: transmitting the device information to a cloud server, thereby enabling the cloud server to extract the device unique identifier and the device model identifier from the device information, and to find functional characteristics corresponding to the controlled terminal device according to the device model identifier.

The step 203 of transmitting the device information to a cloud server, thereby enabling the cloud server to extract the device unique identifier and the device model identifier from the device information, and to find functional characteristics corresponding to the controlled terminal device according to the device model identifier, may refer to description of the corresponding part in FIG. 1, which will not be repeated herein.

Further, in one embodiment of the present disclosure, when the cloud server fails to extract the device unique identifier and device model identifier corresponding to the controlled terminal device from the device information corresponding to the controlled terminal device, the cloud server transmits an error message to the client application program. When the client application program receives the error message transmitted by the cloud server, the client application program may output a preset prompt reminder (i.e., a second preset prompt reminder) to notify the user that the QR code has been scanned incorrectly. Then, the user can recall the preset camera through the client application program, and scan the QR code corresponding to the controlled terminal device through the preset camera.

Step 204: receiving the device unique identifier and the functional characteristics transmitted by the cloud server.

The step 204 of receiving the device unique identifier and the functional characteristics transmitted by the cloud server may refer to description of the corresponding part in FIG. 1, which will not be repeated herein.

Step 205: establishing a Bluetooth connection with the controlled terminal device according to the device unique identifier.

In one embodiment of the present disclosure, since a Bluetooth device name corresponding to the controlled terminal device is generated based on the device unique identifier corresponding to the controlled terminal device, after the client application program receives the device unique identifier and functional characteristics corresponding to the controlled terminal device transmitted by the cloud server, the client application program can search for the controlled terminal device according to the device unique identifier corresponding to the controlled terminal device, thereby obtaining the Bluetooth address corresponding to the controlled terminal device and then establishing a Bluetooth connection with the controlled terminal device based on the Bluetooth address corresponding to the controlled terminal device.

How the client application program establishes a Bluetooth connection with the controlled terminal device based on the device unique identifier corresponding to the controlled terminal device will be described in details hereinafter.

(1) Splicing processing is performed on the device unique identifier according to a preset rule, thereby generating a Bluetooth matching name corresponding to the controlled terminal device.

The controlling terminal device locally stores a mapping relationship between a company identifier and a product line identifier corresponding to each model of terminal device. The preset rule is a splicing rule used by the controlled terminal device for generating the Bluetooth matching name corresponding to the controlled terminal device.

In one embodiment of the present disclosure, a Bluetooth device name corresponding to the controlled terminal device is generated by the controlled terminal device in a way of splicing the company identifier and the device unique identifier corresponding to the controlled terminal device. Thus, after the client application program receives the device unique identifier and functional characteristics corresponding to the controlled terminal device transmitted by the cloud server, the client application program finds the company identifier corresponding to the controlled terminal device in a local storage space according to the product line identifier corresponding to controlled terminal device obtained in the step 202. Then, the client application program performs splicing processing on the device unique identifier and the company identifier corresponding to controlled terminal device according to the preset rule (i.e., a splicing rule used by the controlled terminal device for generating the Bluetooth matching name corresponding to the controlled terminal device), thereby generating a Bluetooth matching name that is the same as the Bluetooth device name corresponding to the controlled terminal device. Subsequently, the controlled terminal device can be searched based on the generated Bluetooth matching name.

(2) Searching for the controlled terminal device based on the Bluetooth matching name, thereby obtaining a Bluetooth address corresponding to the controlled terminal device.

In one embodiment of the present disclosure, the Bluetooth matching name generated by the client application program in the step (1) is the same as the Bluetooth device name corresponding to the controlled terminal device, thus, the client application program can find the controlled terminal device based on the generated Bluetooth matching name, thereby obtaining the Bluetooth address corresponding to the controlled terminal device.

Further, in one embodiment of the present disclosure, when the client application program fails to find the controlled terminal device based on the generated Bluetooth matching name, the client application program may output a preset prompt reminder to remind the user that the Bluetooth function of the controlled terminal device is not turned on.

(3) Establishing a Bluetooth connection with the controlled terminal device based on the Bluetooth address.

In one embodiment of the present disclosure, after the client application program obtains the Bluetooth address corresponding to the controlled terminal device, the client application program can establish the Bluetooth connection with the controlled terminal device based on the Bluetooth address corresponding to the controlled terminal device. First, the client application program judges whether cache configuration information corresponding to the controlled terminal device is stored in a local storage space of the controlling terminal device according to the Bluetooth address corresponding to the controlled terminal device. The cache configuration information corresponding to the controlled terminal device is information for configuring a Bluetooth adapter in the controlling terminal device, which is obtained by the client application program according to the Bluetooth address corresponding to the controlled terminal device during the last process of establishing a Bluetooth connection between the controlling terminal device and the controlled terminal device. When the cache configuration information corresponding to the controlled terminal device is stored in the local storage space of the controlling terminal device, the client application program can directly use the cache configuration information corresponding to the controlled terminal device to configure the Bluetooth adapter, thereby establishing the Bluetooth connection with the controlled terminal device. When the cache configuration information corresponding to the controlled terminal device is not stored in the local storage space of the controlling terminal device, the client application program needs to obtain configuration information for configuring the Bluetooth adapter according to the Bluetooth address corresponding to the controlled terminal device, and then uses the obtained configuration information to configure the Bluetooth adapter, thereby establishing the Bluetooth connection with the controlled terminal device.

Further, in one embodiment of the present disclosure, after the client application program obtains the configuration information for configuring the Bluetooth adapter according to the Bluetooth address corresponding to the controlled terminal device, the client application program may store the obtained the configuration information in the local storage space of the controlling terminal device, so that the client application program can directly use the configuration information to configure the Bluetooth adapter when establishing the Bluetooth connection between the controlling terminal device and the controlled terminal device for the next time, thereby establishing the Bluetooth connection with the controlled terminal device.

Further, in one embodiment of the present disclosure, when establishing a Bluetooth connection with the controlled terminal device fails, the client application program may execute the above steps (1)-(3) again, thereby re-establishing the Bluetooth connection with the controlled terminal device. When the Bluetooth connection with the controlled terminal device fails to be established for multiple times, the client application program may output a preset prompt reminder (that is, the first preset prompt reminder) to notify the user that the Bluetooth connection is abnormal. Specifically, in this step, when establishing a Bluetooth connection with the controlled terminal device fails, if the client application program configures the Bluetooth adapter with the cache configuration information corresponding to the controlled terminal device, the client application program may first clear the cache configuration information corresponding to the controlled terminal device, and then obtain configuration information for configuring the Bluetooth adapter according to the Bluetooth address corresponding to the controlled terminal device, and then use the obtained configuration information to configure the Bluetooth adapter, thereby establishing a Bluetooth connection with the controlled terminal device.

Further, in one embodiment of the present disclosure, a same check code may be stored in the controlling terminal device and the controlled terminal device in advance. After establishing a Bluetooth connection with the controlled terminal device, the client application program needs to transmit the stored check code (i.e., preset check code) to the controlled terminal device, so that the controlled terminal device performs identity verification for the controlling terminal device. In other words, the controlled terminal device compares whether the check code transmitted by the controlling terminal device is consistent with the check code pre-stored in the controlled terminal device, to determine whether to maintain the Bluetooth connection with the controlling terminal device. When the check code transmitted by the controlling terminal device is consistent with the check code pre-stored in the controlled terminal device (i.e., the identity verification is successful), the controlled terminal device maintains the Bluetooth connection with the controlling terminal device. When the check code transmitted by the controlling terminal device is not consistent with the check code pre-stored in the controlled terminal device (i.e., the identity verification is unsuccessful), the controlled terminal device disconnects the Bluetooth connection with the controlling terminal device, thereby ensuring that one terminal device which does not store the check code cannot establish a Bluetooth connection with the controlled terminal device.

Step 206: outputting and displaying a function page corresponding to the controlled terminal device according to the functional characteristics.

In one embodiment of the present disclosure, after establishing the Bluetooth connection with the controlled terminal device, the client application program can select function pages (i.e., function page corresponding to each function of the controlled terminal device) corresponding to the controlled terminal device from multiple preset function pages according to the functional characteristics corresponding to the controlled terminal device, and can output and display the function page corresponding to the controlled terminal device through the screen of the controlling terminal device. Since functions indicated in each function page displayed and outputted by the client application program through the screen of the controlling terminal device are multiple functions possessed by the controlled terminal device, the user can know what functions the controlled terminal device has through the function page displayed and outputted by the client application program, and then the user can accurately control the controlled terminal device to perform corresponding operations through the client application program (i.e., controlling terminal device).

Further, in one embodiment of the present disclosure, after the client application program outputs and displays the function pages corresponding to the controlled terminal device according to the functional characteristics corresponding to the controlled terminal device, the user can perform corresponding operations in any function page. At this point, the client application program can receive the user's operation instruction on the function page, and can transmit the received operation instruction to the controlled terminal device through the Bluetooth connection with the controlled terminal device. Then, the controlled terminal device can perform the operation corresponding to the operation instruction, so that the user can control the controlled terminal device to perform corresponding operations through the client application program (i.e., controlling terminal device).

In order to achieve the above object, according to another aspect of the present disclosure, one embodiment of the present disclosure further provides an electronic device. The electronic device includes a memory, a processor and a program stored on the memory and executable on the processor. The processor executes the program to implement the above Bluetooth connection establishment method.

In order to achieve the above object, according to another aspect of the present disclosure, one embodiment of the present disclosure further provides a computer-readable storage medium having a computer program stored thereon. The program is executed to implement the above Bluetooth connection establishment method.

Figure 3:
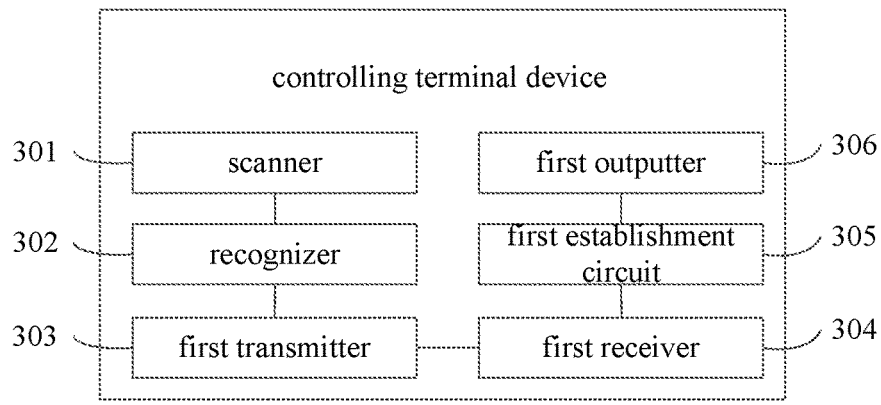
FIG. 3 is a block diagram of a controlling terminal device according to an embodiment of the present disclosure.

Further, as an implementation of the method shown in FIG. 1 and FIG. 2, one embodiment of the present disclosure provides a controlling terminal device. This device embodiment corresponds to the above method embodiment. For readability, this device embodiment does not repeat the details of the above method embodiment, but it should be noted that the controlling terminal device in this embodiment can implement entire contents of the above method embodiment. The controlling terminal device is used to ensure that a user can accurately control the controlled terminal device to perform the corresponding operation through the controlling terminal device. As shown in FIG. 3, the controlling terminal device includes:

a scanner 301 configured to scan a quick response (QR) code corresponding to a controlled terminal device;

a recognizer 302 configured to identify the QR code through a preset algorithm to obtain device information corresponding to the controlled terminal device; where the device information includes device unique identifier and device model identifier corresponding to the controlled terminal device;

a first transmitter 303 configured to transmit the device information to a cloud server, thereby enabling the cloud server to extract the device unique identifier and the device model identifier from the device information, and to find functional characteristics corresponding to the controlled terminal device according to the device model identifier;

a first receiver 304 configured to receive the device unique identifier and the functional characteristics transmitted by the cloud server;

a first establishment circuit 305 configured to establish a Bluetooth connection with the controlled terminal device according to the device unique identifier;

a first outputter 306 configured to output and display a function page corresponding to the controlled terminal device according to the functional characteristics.

Figure 4:
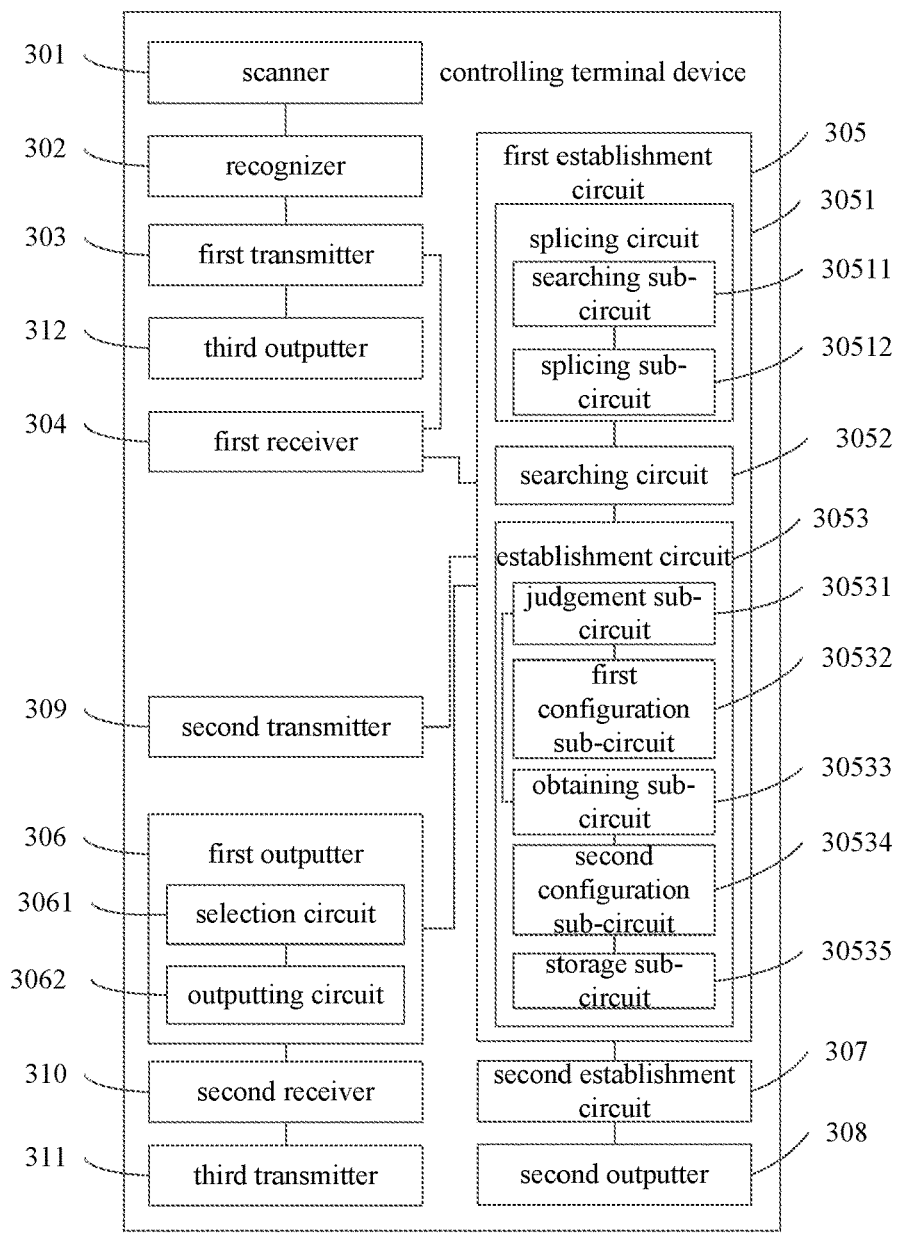
FIG. 4 is another block diagram of a controlling terminal device according to an embodiment of the present disclosure.

Further, as shown in FIG. 4, the first establishment circuit 305 includes:

a splicing circuit 3051 configured to perform splicing processing on the device unique identifier according to a preset rule, thereby generating a Bluetooth matching name corresponding to the controlled terminal device;

a searching circuit 3052 configured to search for the controlled terminal device based on the Bluetooth matching name, thereby obtaining a Bluetooth address corresponding to the controlled terminal device;

an establishment circuit 3053 configured to establish a Bluetooth connection with the controlled terminal device based on the Bluetooth address.

Further, as shown in FIG. 4, the QR code further records a product line identifier corresponding to the controlled terminal device. The recognizer 302 is configured to identify the QR code through a preset algorithm to obtain device information and product line identifier corresponding to the controlled terminal device.

The splicing circuit 3051 includes:

a searching sub-circuit 30511 configured to search for a company identifier corresponding to the controlled terminal device according to the product line identifier;

a splicing sub-circuit 30512 configured to splice the company identifier and the device unique identifier according to a preset rule, thereby generating a Bluetooth matching name.

Further, as shown in FIG. 4, the establishment circuit 3053 includes:

a judgement sub-circuit 30531 configured to judge whether cache configuration information corresponding to the controlled terminal device is stored in a local storage space according to the Bluetooth address;

a first configuration sub-circuit 30532 configured to, when the judgement sub-circuit 30531 judges that the cache configuration information corresponding to the controlled terminal device is stored in the local storage space of the controlling terminal device, use the cache configuration information to configure the Bluetooth adapter, thereby establishing the Bluetooth connection with the controlled terminal device;

an obtaining sub-circuit 30533 configured to, when the judgement sub-circuit 30531 judges that the cache configuration information corresponding to the controlled terminal device is not stored in the local storage space of the controlling terminal device, obtain configuration information corresponding to the controlled terminal device according to the Bluetooth address;

a second configuration sub-circuit 30534 configured to, use the obtained configuration information to configure the Bluetooth adapter, thereby establishing the Bluetooth connection with the controlled terminal device.

Further, as shown in FIG. 4, the establishment circuit 3053 includes:

a storage sub-circuit 30535 configured to, after the obtaining sub-circuit 30533 obtains the configuration information corresponding to the controlled terminal device according to the Bluetooth address, store the obtained configuration information in the local storage space.

Further, as shown in FIG. 4, the controlling terminal device further includes:

a second establishment circuit 307 configured to, when establishing a Bluetooth connection with the controlled terminal device fails, re-establish the Bluetooth connection with the controlled terminal device according to the device unique identifier;

a second outputter 308 configured to, when the Bluetooth connection with the controlled terminal device fails to be established for multiple times, output a first preset prompt reminder to notify the user that the Bluetooth connection is abnormal.

Further, as shown in FIG. 4, the controlling terminal device further includes:

a second transmitter 309 configured to, after the first establishment circuit 305 establishes the Bluetooth connection with the controlled terminal device according to the device unique identifier, transmit a preset check code to the controlled terminal device, so that the controlled terminal device performs identity verification for the controlling terminal device, to determine whether to maintain the Bluetooth connection with the controlling terminal device.

Further, as shown in FIG. 4, the first outputter 306 includes:

a selection circuit 3061 configured to select function pages corresponding to the controlled terminal device from multiple preset function pages according to the functional characteristics;

an outputting circuit 3062 configured to output and display the function page corresponding to the controlled terminal device through a screen of the controlling terminal device.

Further, as shown in FIG. 4, the controlling terminal device further includes:

a second receiver 310 configured to, after the first outputter 306 outputs and displays the function page corresponding to the controlled terminal device according to the functional characteristics, receive the user's operation instruction on the function page;

a third transmitter 311 configured to transmit the operation instruction to the controlled terminal device through the Bluetooth connection with the controlled terminal device, thereby enabling the controlled terminal device to perform the operation corresponding to the operation instruction.

Further, as shown in FIG. 4, the controlling terminal device further includes: a third outputter 312 configured to, when receiving an error message transmitted by the cloud server, output a second preset prompt reminder to notify the user that the QR code has been scanned incorrectly.

Figure 5:
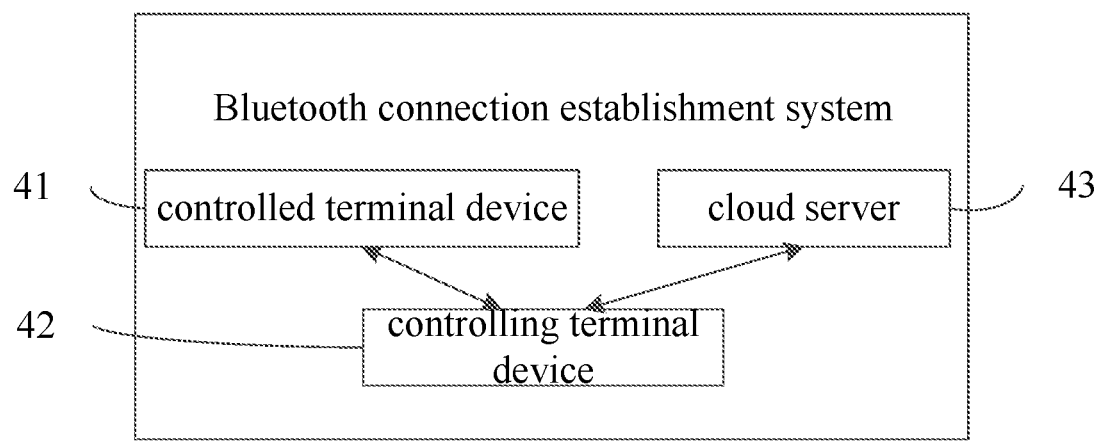
FIG. 5 is a block diagram of a Bluetooth connection establishment system according to an embodiment of the present disclosure.

Further, as implementation of the above method and application of the above controlling terminal device, one embodiment of the present disclosure further provides a Bluetooth connection establishment system. As shown in FIG. 5, the system includes: a controlled terminal device 41, a controlling terminal device 42 as shown in FIG. 3 or FIG. 4, and a cloud server 43.

The controlled terminal device 41 is configured to generate a quick response (QR) code according to device information corresponding to the controlled terminal device; where the device information includes device unique identifier and device model identifier corresponding to the controlled terminal device 41.

The controlling terminal device 42 is configured to scan the QR code, identify the QR code through a preset algorithm to obtain the device information corresponding to the controlled terminal device 41, and transmit the device information to the cloud server 43.

The cloud server 43 is configured to extract the device unique identifier and the device model identifier corresponding to the controlled terminal device 41 from the device information, find functional characteristics corresponding to the controlled terminal device 41 according to the device model identifier, and transmit the device unique identifier and the functional characteristics to the controlling terminal device 42.

The controlling terminal device 42 is further configured to receive the device unique identifier and the functional characteristics transmitted by the cloud server 43, establish a Bluetooth connection with the controlled terminal device 41 according to the device unique identifier, and output and display a function page corresponding to the controlled terminal device 41 according to the functional characteristics.

Further, the controlled terminal device 41 is specifically configured to generate the QR code according to device information and product line identifier corresponding to the controlled terminal device 41.

The controlling terminal device 42 is specifically configured to scan the QR code, and identify the QR code through a preset algorithm to obtain the device information and product line identifier corresponding to the controlled terminal device 41; search for a company identifier corresponding to the controlled terminal device 41 according to the product line identifier; splice the company identifier and the device unique identifier according to a preset rule, thereby generating a Bluetooth matching name; search for the controlled terminal device 41 according to the Bluetooth matching name, thereby obtaining the Bluetooth address corresponding to the controlled terminal device 41 and then establishing a Bluetooth connection with the controlled terminal device 41 based on the Bluetooth address.

Further, the controlling terminal device 42 is further configured to, after establishing the Bluetooth connection with the controlled terminal device 41 according to the device unique identifier, transmit a preset check code to the controlled terminal device 41.

The controlled terminal device 41 is further configured to perform identity verification for the controlling terminal device 42 based on the preset check code; when the identity verification is successful, maintain the Bluetooth connection with the controlling terminal device 42; when the identity verification is unsuccessful, disconnect the Bluetooth connection with the controlling terminal device 42.

Further, the cloud server 43 is configured to, when failing to extract the device unique identifier and device model identifier corresponding to the controlled terminal device 41 from the device information, transmit an error message to the controlling terminal device 42.

The controlling terminal device 42 is further configured to, when receiving the error message transmitted by the cloud server, output a second preset prompt reminder to notify the user that the QR code has been scanned incorrectly.

In summary, according to the Bluetooth connection establishment method, the Bluetooth connection establishment device and the Bluetooth connection establishment system, compared with the related art in which a controlling terminal device and a controlled terminal device use their respective Bluetooth addresses as unique identification identifiers when they establish a Bluetooth connection, in the embodiments of the present disclosure, the controlled terminal device generates in advance the QR code according to the device information (i.e., device unique identifier and device model identifier corresponding to the controlled terminal device) corresponding to the controlled terminal device, outputs and displays the generated QR code through a screen of the controlled terminal device; when the user needs to establish a Bluetooth connection between the controlling terminal device and the controlled terminal device, the user first needs to call a preset camera through the client application program in the controlling terminal device and then scan the QR code corresponding to the controlled terminal device through the called preset camera; after obtaining the scanned QR code corresponding to the controlled terminal device, the client application program can identify the scanned QR code through the preset algorithm, thereby obtaining the device information corresponding to the controlled terminal device and transmitting the obtained device information to the cloud server. Then, the cloud server extracts the device unique identifier and device model identifier corresponding to the controlled terminal device from the device information corresponding to the controlled terminal device, finds functional characteristics corresponding to the controlled terminal device according to the device model identifier corresponding to the controlled terminal device, and then transmits the device model identifier and functional characteristics corresponding to the controlled terminal device to the client application program. Since a Bluetooth device name corresponding to the controlled terminal device is generated based on the device unique identifier corresponding to the controlled terminal device, the client application program can search for the controlled terminal device according to the device unique identifier corresponding to the controlled terminal device, and then establish a Bluetooth connection with the controlled terminal device. After establishing the Bluetooth connection with the controlled terminal device, the client application program can output and display the function page corresponding to the controlled terminal device according to the functional characteristics corresponding to the controlled terminal device. Since functions indicated in each function page displayed and outputted by the client application program are multiple functions possessed by the controlled terminal device, the user can know what functions the controlled terminal device has through the function page displayed and outputted by the client application program. Then, the user can accurately control the controlled terminal device to perform corresponding operations through the client application program (i.e., controlling terminal device).

The controlling terminal device includes a processor and a memory. The above scanner, the recognizer, the first transmitter, the first receiver, the first establishment circuit and the first outputter may be taken as program units stored in the memory. The above program units stored in the memory may be executed by the processor to realize the corresponding functions.

The processor contains a core, and the core calls the corresponding program unit from the memory. There may be one or more cores. By adjusting parameters of cores, it can be ensured that the user can accurately control the controlled terminal device to perform the corresponding operation by the controlling the terminal device.

The above memory may include a non-persistent memory, a random access memory (RAM) and/or non-volatile memory in a computer readable medium, such as read only memory (ROM) or flash memory. The memory includes at least one memory chip.

One embodiment of the present disclosure provides an electronic device. The electronic device includes a memory, a processor and a program stored on the memory and executable on the processor. The processor executes the program to implement the Bluetooth connection establishment method.

One embodiment of the present disclosure further provides a computer readable medium, which stores a computer program thereon. The program is executed to implement the Bluetooth connection establishment method.

One embodiment of the present disclosure further provides a device which includes a processor, a memory, and a program stored on the memory and executable on the processor. The processor executes the program to implement the following steps:

scanning a quick response (QR) code corresponding to a controlled terminal device, and identifying the QR code through a preset algorithm to obtain device information corresponding to the controlled terminal device; where the device information includes device unique identifier and device model identifier corresponding to the controlled terminal device;

transmitting the device information to a cloud server, thereby enabling the cloud server to extract the device unique identifier and the device model identifier from the device information, and to find functional characteristics corresponding to the controlled terminal device according to the device model identifier;

receiving the device unique identifier and the functional characteristics transmitted by the cloud server;

establishing a Bluetooth connection with the controlled terminal device according to the device unique identifier, and outputting and displaying a function page corresponding to the controlled terminal device according to the functional characteristics.

Further, the establishing a Bluetooth connection with the controlled terminal device according to the device unique identifier, includes:

performing splicing processing on the device unique identifier according to a preset rule, thereby generating a Bluetooth matching name corresponding to the controlled terminal device;

searching for the controlled terminal device based on the Bluetooth matching name, thereby obtaining a Bluetooth address corresponding to the controlled terminal device;

establishing a Bluetooth connection with the controlled terminal device based on the Bluetooth address.

Further, the QR code further records a product line identifier corresponding to the controlled terminal device; the identifying the QR code through a preset algorithm to obtain device information corresponding to the controlled terminal device, includes: identifying the QR code through a preset algorithm to obtain device information and product line identifier corresponding to the controlled terminal device.

The performing splicing processing on the device unique identifier according to a preset rule, thereby generating a Bluetooth matching name corresponding to the controlled terminal device, includes:

searching for a company identifier corresponding to the controlled terminal device according to the product line identifier;

splicing the company identifier and the device unique identifier according to a preset rule, thereby generating a Bluetooth matching name.

Further, the establishing a Bluetooth connection with the controlled terminal device based on the Bluetooth address, includes:

judging whether cache configuration information corresponding to the controlled terminal device is stored in a local storage space according to the Bluetooth address;

when the cache configuration information corresponding to the controlled terminal device is stored in the local storage space of the controlling terminal device, using the cache configuration information to configure the Bluetooth adapter, thereby establishing the Bluetooth connection with the controlled terminal device;

when the cache configuration information corresponding to the controlled terminal device is not stored in the local storage space of the controlling terminal device, obtaining configuration information corresponding to the controlled terminal device according to the Bluetooth address, and using the obtained configuration information to configure the Bluetooth adapter, thereby establishing the Bluetooth connection with the controlled terminal device.

Further, after obtaining the configuration information corresponding to the controlled terminal device according to the Bluetooth address, the method further includes: storing the obtained configuration information in the local storage space.

Further, the method further includes:

when establishing a Bluetooth connection with the controlled terminal device fails, re-establishing the Bluetooth connection with the controlled terminal device according to the device unique identifier;

when the Bluetooth connection with the controlled terminal device fails to be established for multiple times, outputting a first preset prompt reminder to notify the user that the Bluetooth connection is abnormal.

Further, after establishing the Bluetooth connection with the controlled terminal device according to the device unique identifier, the method further includes: transmitting a preset check code to the controlled terminal device, so that the controlled terminal device performs identity verification for the controlling terminal device, to determine whether to maintain the Bluetooth connection with the controlling terminal device.

Further, the outputting and displaying a function page corresponding to the controlled terminal device according to the functional characteristics, includes:

selecting function pages corresponding to the controlled terminal device from multiple preset function pages according to the functional characteristics;

outputting and displaying the function page corresponding to the controlled terminal device through a screen of the controlling terminal device.

Further, after the outputting and displaying a function page corresponding to the controlled terminal device according to the functional characteristics, the method further includes:

receiving the user's operation instruction on the function page;

transmitting the operation instruction to the controlled terminal device through the Bluetooth connection with the controlled terminal device, thereby enabling the controlled terminal device to perform the operation corresponding to the operation instruction.

Further, the method further includes: when receiving an error message transmitted by the cloud server, outputting a second preset prompt reminder to notify the user that the QR code has been scanned incorrectly.

The device in this application may be a smart phone, a tablet computer, a laptop computer, etc.

One embodiment of the present disclosure further provides a computer program product. The computer program product is executed on a data processing device to execute program codes with the following method steps: scanning a quick response (QR) code corresponding to a controlled terminal device, and identifying the QR code through a preset algorithm to obtain device information corresponding to the controlled terminal device, where the device information includes device unique identifier and device model identifier corresponding to the controlled terminal device; transmitting the device information to a cloud server, thereby enabling the cloud server to extract the device unique identifier and the device model identifier from the device information, and to find functional characteristics corresponding to the controlled terminal device according to the device model identifier; receiving the device unique identifier and the functional characteristics transmitted by the cloud server; establishing a Bluetooth connection with the controlled terminal device according to the device unique identifier, and outputting and displaying a function page corresponding to the controlled terminal device according to the functional characteristics.

Those skilled in the art will appreciate that embodiments of the present disclosure may be provided as a method, system, or computer program product. Accordingly, the present disclosure may take the form of an entirely hardware embodiment, an entirely software embodiment, or a combination of software and hardware. Moreover, the present disclosure can take the form of a computer program product embodied on one or more computer-usable storage media (including but not limited to disk storage, CD-ROM, optical storage, etc.) including computer usable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

In a typical configuration, a computing device includes one or more processors (CPUs), input/output interfaces, network interfaces, and a memory.

The memory may include a non-persistent memory, a random access memory (RAM) and/or non-volatile memory in a computer readable medium, such as read only memory (ROM) or flash memory. The memory is an example of a computer readable medium.

The computer readable media may be permanent and non-persistent, removable and non-removable media, which can store information by any method or technology. The information may be computer-readable instructions, data structures, modules of a program, or other data. Examples of the computer storage media include, but are not limited to, phase change memory (PRAM), static random access memory (SRAM), dynamic random access memory (DRAM), other types of random access memory (RAM), and read-only memory (ROM), electrically erasable programmable read-only memory (EEPROM), flash memory or other memory technology, read-only disc read-only memory (CD-ROM), digital versatile disc (DVD) or other optical storage, magnetic tape cartridges, magnetic tape magnetic disk storage or other magnetic storage devices or any other non-transmission media which may be used to store information that can be accessed by computing devices. As defined herein, the computer-readable media does not include computer-readable transitory media such as modulated data signals and carrier waves.

It should be noted that, the terms "comprise", "include" or any other variations are intended to encompass a non-exclusive inclusion, such that a process, method, system, article or device that include a series of steps or elements include not only those steps or elements but also other steps or elements that are not explicitly listed, or steps or elements that are inherent to such process, method, article or device. Without more restrictions, an element defined by the sentence "including a . . . " does not exclude that there are other identical elements in the process, method, article or device that includes the element.

Through the description of the above embodiments, those skilled in the art can clearly understand that the methods in the above embodiments may be implemented by means of software plus a necessary universal hardware platform, and of course, may be implemented by hardware, but in many cases the former is better implementation. Based on such understanding, the technical solution of the present disclosure that is essentially or contributes to the existing technology may be embodied in the form of a software product, which is stored in a storage medium (such as ROM/RAM, magnetic disk, optical disc) including several instructions for causing a terminal device (which may be a mobile phone, a computer, a server, an air conditioner, or a network device) to execute the methods described in the embodiments of the present disclosure.

The above are only the specific embodiments of the present disclosure, but the protection scope of the present disclosure is not limited to these embodiments. Any technical personnel who is familiar with the technical field can easily think of changes or substitutions within the technical scope of the present disclosure and these changes and substitutions should be included in the protection scope of the present disclosure.

What is claimed is:

1. A Bluetooth connection establishment method, applied to a controlling terminal device, comprising:
scanning a quick response (QR) code corresponding to a controlled terminal device, and identifying the QR code through a preset algorithm to obtain device information corresponding to the controlled terminal device; wherein the device information includes device unique identifier and device model identifier corresponding to the controlled terminal device;
transmitting the device information to a cloud server, thereby enabling the cloud server to extract the device unique identifier and the device model identifier from the device information, and to find functional characteristics corresponding to the controlled terminal device according to the device model identifier;
receiving the device unique identifier and the functional characteristics transmitted by the cloud server; and
establishing a Bluetooth connection with the controlled terminal device according to the device unique identifier, and outputting and displaying a function page corresponding to the controlled terminal device according to the functional characteristics,
wherein the establishing a Bluetooth connection with the controlled terminal device according to the device unique identifier includes:
performing splicing processing on the device unique identifier according to a preset rule, thereby generating a Bluetooth matching name corresponding to the controlled terminal device;
searching for the controlled terminal device based on the Bluetooth matching name, thereby obtaining a Bluetooth address corresponding to the controlled terminal device; and
establishing the Bluetooth connection with the controlled terminal device based on the Bluetooth address.

2. The method according to claim 1, wherein the QR code further records a product line identifier corresponding to the controlled terminal device; the identifying the QR code through a preset algorithm to obtain device information corresponding to the controlled terminal device, includes:
identifying the QR code through the preset algorithm to obtain the device information and product line identifier corresponding to the controlled terminal device;
the performing splicing processing on the device unique identifier according to a preset rule, thereby generating a Bluetooth matching name corresponding to the controlled terminal device, includes:
searching for a company identifier corresponding to the controlled terminal device according to the product line identifier;
splicing the company identifier and the device unique identifier according to the preset rule, thereby generating the Bluetooth matching name.

3. The method according to claim 1, wherein the establishing a Bluetooth connection with the controlled terminal device based on the Bluetooth address, includes:
judging whether cache configuration information corresponding to the controlled terminal device is stored in a local storage space according to the Bluetooth address;
when the cache configuration information corresponding to the controlled terminal device is stored in the local storage space, using the cache configuration information to configure a Bluetooth adapter, thereby establishing the Bluetooth connection with the controlled terminal device;
when the cache configuration information corresponding to the controlled terminal device is not stored in the local storage space, obtaining configuration information corresponding to the controlled terminal device according to the Bluetooth address, and using the obtained configuration information to configure the Bluetooth adapter, thereby establishing the Bluetooth connection with the controlled terminal device.

4. The method according to claim 3, wherein after obtaining the configuration information corresponding to the controlled terminal device according to the Bluetooth address, the method further includes: storing the obtained configuration information in the local storage space.

5. The method according to claim 1, wherein the method further includes:
when establishing a Bluetooth connection with the controlled terminal device fails, re-establishing a Bluetooth connection with the controlled terminal device according to the device unique identifier;

when a Bluetooth connection with the controlled terminal device fails to be established for multiple times, outputting a first preset prompt reminder to notify that Bluetooth connection is abnormal.

6. The method according to claim 1, wherein after the establishing a Bluetooth connection with the controlled terminal device according to the device unique identifier, the method further includes:
transmitting a preset check code to the controlled terminal device, thereby enabling the controlled terminal device to perform identity verification for the controlling terminal device, to determine whether to maintain the Bluetooth connection with the controlling terminal device.

7. The method according to claim 1, wherein the outputting and displaying a function page corresponding to the controlled terminal device according to the functional characteristics, includes:
selecting function pages corresponding to the controlled terminal device from multiple preset function pages according to the functional characteristics;
outputting and displaying the function page corresponding to the controlled terminal device through a screen.

8. The method according to claim 1, wherein after the outputting and displaying a function page corresponding to the controlled terminal device according to the functional characteristics, the method further includes:
receiving an operation instruction on the function page;
transmitting the operation instruction to the controlled terminal device through the Bluetooth connection with the controlled terminal device, thereby enabling the controlled terminal device to perform operation corresponding to the operation instruction.

9. The method according to claim 1, wherein the method further includes:
when receiving an error message transmitted by the cloud server, outputting a second preset prompt reminder to notify that the QR code has been scanned incorrectly.

10. A controlling terminal device comprising:
a scanner configured to scan a quick response (QR) code corresponding to a controlled terminal device;
a recognizer configured to identify the QR code through a preset algorithm to obtain device information corresponding to the controlled terminal device; wherein the device information includes device unique identifier and device model identifier corresponding to the controlled terminal device;
a first transmitter configured to transmit the device information to a cloud server, thereby enabling the cloud server to extract the device unique identifier and the device model identifier from the device information, and to find functional characteristics corresponding to the controlled terminal device according to the device model identifier;
a first receiver configured to receive the device unique identifier and the functional characteristics transmitted by the cloud server;
a first establishment circuit configured to establish a Bluetooth connection with the controlled terminal device according to the device unique identifier;
a first outputter configured to output and display a function page corresponding to the controlled terminal device according to the functional characteristics,
wherein the first establishment circuit includes:
a splicing circuit configured to perform splicing processing on the device unique identifier according to a preset rule, thereby generating a Bluetooth matching name corresponding to the controlled terminal device;
a searching circuit configured to search for the controlled terminal device based on the Bluetooth matching name, thereby obtaining a Bluetooth address corresponding to the controlled terminal device; and
an establishment circuit configured to establish a Bluetooth connection with the controlled terminal device based on the Bluetooth address.

11. The controlling terminal device according to claim 10, wherein the QR code further records a product line identifier corresponding to the controlled terminal device;
the recognizer is configured to identify the QR code through the preset algorithm to obtain device information and product line identifier corresponding to the controlled terminal device;
the splicing circuit includes:
a searching sub-circuit configured to search for a company identifier corresponding to the controlled terminal device according to the product line identifier;
a splicing sub-circuit configured to splice the company identifier and the device unique identifier according to the preset rule, thereby generating the Bluetooth matching name.

12. The controlling terminal device according to claim 10, wherein the establishment circuit includes:
a judgement sub-circuit configured to judge whether cache configuration information corresponding to the controlled terminal device is stored in a local storage space according to the Bluetooth address;
a first configuration sub-circuit configured to, when the judgement sub-circuit judges that the cache configuration information corresponding to the controlled terminal device is stored in the local storage space, use the cache configuration information to configure a Bluetooth adapter, thereby establishing the Bluetooth connection with the controlled terminal device;
an obtaining sub-circuit configured to, when the judgement sub-circuit judges that the cache configuration information corresponding to the controlled terminal device is not stored in the local storage space, obtain configuration information corresponding to the controlled terminal device according to the Bluetooth address;
a second configuration sub-circuit configured to, use the obtained configuration information to configure the Bluetooth adapter, thereby establishing the Bluetooth connection with the controlled terminal device.

13. The controlling terminal device according to claim 12, wherein the establishment circuit further includes:
a storage sub-circuit configured to, after the obtaining sub-circuit obtains the configuration information corresponding to the controlled terminal device according to the Bluetooth address, store the obtained configuration information in the local storage space.

14. The controlling terminal device according to claim 10, wherein the controlling terminal device further includes:
a second establishment circuit configured to, when establishing a Bluetooth connection with the controlled terminal device fails, re-establish a Bluetooth connection with the controlled terminal device according to the device unique identifier;
a second outputter configured to, when a Bluetooth connection with the controlled terminal device fails to be established for multiple times, output a first preset prompt reminder to notify that the Bluetooth connection is abnormal;

a third outputter configured to, when receiving an error message transmitted by the cloud server, output a second preset prompt reminder to notify that the QR code has been scanned incorrectly.

15. The controlling terminal device according to claim 10, wherein the controlling terminal device further includes:

a second transmitter configured to, after the first establishment circuit establishes the Bluetooth connection with the controlled terminal device according to the device unique identifier, transmit a preset check code to the controlled terminal device, thereby enabling the controlled terminal device to perform identity verification for the controlling terminal device, to determine whether to maintain the Bluetooth connection with the controlling terminal device.

16. The controlling terminal device according to claim 10, wherein the first outputter includes:

a selection circuit configured to select function pages corresponding to the controlled terminal device from multiple preset function pages according to the functional characteristics;

an outputting circuit configured to output and display the function page corresponding to the controlled terminal device through a screen.

17. The controlling terminal device according to claim 10, wherein the controlling terminal device further includes:

a second receiver configured to, after the first outputter outputs and displays the function page corresponding to the controlled terminal device according to the functional characteristics, receive an operation instruction on the function page;

a third transmitter configured to transmit the operation instruction to the controlled terminal device through the Bluetooth connection with the controlled terminal device, thereby enabling the controlled terminal device to perform operation corresponding to the operation instruction.

18. An electronic device comprising:
a memory;
a processor; and
a program stored on the memory and executable on the processor;
wherein the processor executes the program to implement a Bluetooth connection establishment method which includes:

scanning a quick response (QR) code corresponding to a controlled terminal device, and identifying the QR code through a preset algorithm to obtain device information corresponding to the controlled terminal device; wherein the device information includes device unique identifier and device model identifier corresponding to the controlled terminal device;

transmitting the device information to a cloud server, thereby enabling the cloud server to extract the device unique identifier and the device model identifier from the device information, and to find functional characteristics corresponding to the controlled terminal device according to the device model identifier;

receiving the device unique identifier and the functional characteristics transmitted by the cloud server; and establishing a Bluetooth connection with the controlled terminal device according to the device unique identifier, and outputting and displaying a function page corresponding to the controlled terminal device according to the functional characteristics, wherein the establishing a Bluetooth connection with the controlled terminal device according to the device unique identifier, includes:

performing splicing processing on the device unique identifier according to a preset rule, thereby generating a Bluetooth matching name corresponding to the controlled terminal device;

searching for the controlled terminal device based on the Bluetooth matching name, thereby obtaining a Bluetooth address corresponding to the controlled terminal device; and establishing the Bluetooth connection with the controlled terminal device based on the Bluetooth address.

\* \* \* \* \*